United States Patent Office 2,779,783
Patented Jan. 29, 1957

2,779,783

PRODUCTION OF LINEAR POLYESTERS OF ALKYLENE DICARBOXYLIC ACIDS

Robert A. Hayes, Akron, Ohio, assignor to The Firestone Tire & Rubber Company, Akron, Ohio, a corporation of Ohio No Drawing. Application September 29, 1954,
Serial No. 459,210

12 Claims. (Cl. 260—485)

This invention relates to the production of moderate molecular weight subresinous linear polyesters of alkylene dicarboxylic acids, suitable for use as non-fugitive plasticizers and also for chain-extension and cross-linking with polyisocyanates to produce resins, adhesives, expanded resin products, elastomers, and the like.

The conventional method of producing linear polyesters of alkylene dicarboxylic acids consists in the reaction of these acids or their anhydrides with glycols under typical esterification conditions. This requires heating at elevated temperatures on the order of 200° C., which tends to degrade the product. Likewise, this reaction results in the evolution of water which must be removed, frequently under vacuum. The equipment required for the conventional process is elaborate and expensive, since the process requires the application of high temperatures, reflux in at least the initial stages of the esterification, and separation and diversion of the evolved water. The requirement of vacuum in the conventional process introduces further complications, particularly the necessity of strengthening the vessel to prevent collapse under vacuum, and the provision and maintenance of the vacuum-generating equipment.

Accordingly, it is an object of this invention to provide a method for the preparation of linear polyesters of alkylene dicarboxylic acids which may be carried out at low temperatures.

Another object is to provide such a process which will make use of mild conditions and catalysts, not harmful to the polyester product.

A further object is to provide such a process in which there is no necessity for the removal of water.

A still further object is to provide such a process which can be carried out in simple and inexpensive equipment with a minimum of skilled supervision, and with the use of relatively short time cycles of operation so as to make the maximum use of the equipment.

SYNOPSIS OF THE INVENTION

The above and other objects are secured, in accordance with this invention, in a process which involves reacting (A) an anhydride of an alkylene dicarboxylic acid with (B) an alkylene oxide which may be ethylene, propylene, or 1,2-butylene oxide at temperatures in the range of 30°–150° C., preferably 65°–85° C. The reaction may be accelerated by the presence of catalytic amounts of strong bases or salts or hydroxides thereof. Esterification proceeds rapidly and smoothly to yield linear polyesters of the alkylene dicarboxylic acids and glycols corresponding to the anhydrides and alkylene oxides used of a moderately high, but subresinous degree of polymerization suitable for use as non-fugitive plasticizers in vinyl and other resins, and as bases for reaction with organic polyisocyanates to yield adhesives, resins, foamed resinous products, elastomers, and the like. Anhydrides of the dicarboxylic acids other than the alkylene dicarboxylic anhydride, if present in the reaction mass, will be drawn into the esterification reaction, and it is to be understood that reactions involving such other dicarboxylic acid anhydrides are to be included in the scope of this invention, provided the amount of alkylene dicarboxylic acid anhydride present is sufficient that the resultant ester is essentially a polyester of the alkylene dicarboxylic acid and glycol corresponding to the anhydride and oxide used, i. e., the alkylene dicarboxylic acid anhydride must be present to the extent of at least 50 mole percent of all anhydrides involved in the reaction. The reactants are supplied to the process of this invention in the mole ratio of alkylene oxide:total acid anhydrides of 4:1 to 0.9:1.0.

THE ALKYLENE DICARBOXYLIC ANHYDRIDE

The alkylene dicarboxylic acid anhydrides employed in this invention may be the anhydrides of any alkylene dicarboxylic acids containing from 4 to 16 carbon atoms, or any mixture of anhydrides individually coming within this category. Examples of suitable anhydrides include succinic anhydride, dodecenyl succinic anhydride, octenyl succinic anhydride, adipic anhydride, azelaic anhydride, and the like.

THE ALKYLENE OXIDE

The alkylene oxides used in this invention may be ethylene oxide, propylene oxide, 1,2-butylene oxide or a mixture of any of these in any proportion. Under the conditions of this reaction, these oxides tend, to some extent, to condense with themselves in the polyester chain, and this may be very desirable in some cases where it is advantageous to produce a final product containing greater amounts of the alkylene oxides than would be stoichiometrically equivalent to the anhydride used. For this reason, it may be desirable to increase the ratio of alkylene oxide:anhydride in the reaction mixture to values as high as 4:1. There appears, however, to be an alternating tendency, and the products will usually be closer to the 1:1 ratio than the mixtures from which they are derived. There does not appear to be any tendency for the anhydrides to repeat themselves in the chain, so that there is no point in reducing the ratio of alkylene oxide: anhydride below the other extreme cited, namely 0.9:1.0.

ANHYDRIDES OTHER THAN THE ALKYLENE DICARBOXYLIC ANHYDRIDE

As noted above, anhydrides of organic dicarboxylic acids other than the alkylene dicarboxylic acids, if present in the reaction mixtures of this invention, will be drawn into the esterification reaction along with the alkylene dicarboxylic anhydride. This is often quite desirable where it is necessary to change the properties of the final polyester product, or where material costs favor substitution. Suitable acid anhydrides of this sort include, for instance, maleic anhydride, phthalic anhydride, tetrahydrophthalic anhydride, dihydrophthalic anhydride, tetrachlorophthalic anhydride and other similar mono-, di-, tri-, or tetra-substituted phthalic anhydrides. It will be understood that these extraneous anhydrides should be present in the reaction mixture in relatively lesser molar proportions than those of the alkylene dicarboxylic acid anhydrides, so that the reaction will be basically one involving the latter anhydrides.

THE CATALYSTS

As noted above, the reactions of this invention are greatly accelerated by the presence of strong bases, and hydroxides and salts thereof. The cationic portion of such catalysts may include for instance, alkali metal and alkaline earth metal ions, and primary, secondary, tertiary and quaternary organic ammonium ions. The anionic portions of such catalysts may include organic acyl radicals, chloride ions, nitrate ions, hydroxy ions, alkoxy ions, etc. All of the catalysts exert their optimum effect in the presence of at least small amounts of water. The catalysts will be employed in the proportion of from about 0.05 to 5% based on the weight of the reaction mixture, and the water which assists the action of the catalyst should be present to the extent of at least 10% based on the weight of the catalyst. Suitable exemplary catalysts include for instance, sodium hydroxide, sodium chloride, sodium acetate, sodium phthalate, sodium ethoxide, calcium chloride, calcium hydroxide, potassium nitrate, diethyl cyclohexylamine, morpholine, dimethylamine, diethylenetriamine and the like.

THE REACTION CONDITIONS

The reaction of this invention can be carried out in very simple equipment which may be, for instance, a reaction kettle provided with heating and cooling means and preferably with means for agitation. This reactor should be closable and sufficiently strong to withstand the moderate pressure generated by the alkylene oxides under the reaction conditions. The reaction is somewhat exothermic, so that means must be provided for removing the heat, once the reaction is started. However, the evolution of heat is neither violent nor explosive, and the reaction is easily controlled at all times. The temperature should be kept within the range 30°–150° C., preferably 65°–85° C., with best results about 70° C. Under these conditions the reaction will be completed within 24 hours.

With the foregoing general discussion in mind there are given herewith detailed specific examples of the practice of this invention. All parts given are by weight.

Example I.—Succinic anhydride-ethylene oxide

| | Parts |
|---|---|
| Succinic anhydride | 100 |
| Ethylene oxide | 44 |
| Sodium hydroxide solution (50% aqueous) | 0.9 |

The above ingredients were charged into a pressure vessel, which was then closed, and the contents agitated at 70° C. for 17 hours. The reaction mass was then cooled and removed from the vessel. The resultant product was a waxy solid having an acid number of 96.

Example II.—Succinic anhydride-propylene oxide in varying proportions

TABLE I

| | Run No. 1 | Run No. 2 | Run No. 3 | Run No. 4 |
|---|---|---|---|---|
| Parts of Reactants Used: | | | | |
| Succinic Anhydride | 25 | 15 | 15 | 15 |
| Propylene Oxide | 17.4 | 20.3 | 23.2 | 29 |
| Sodium Hydroxide Solution (50% aqueous) | 0.5 | 0.25 | 0.25 | 0.25 |
| Water | 0 | 0.25 | 0.25 | 0.25 |
| Time of Reaction (hrs.) | 18 | 16½ | 16½ | 16½ |
| Acid Number of Product | | 13 | 30 | 74 |

A series of reactions was carried out between succinic anhydride and propylene oxide, using these ingredients together with sodium hydroxide catalyst and water in the various proportions set forth in the above table. In each run the ingredients were charged into a pressure vessel, which was then sealed, and the reactants were agitated together at 70° C. for the time set forth in the table. In each case there resulted a viscous polyester having good color. The acid numbers of these products are set forth in the table.

Example III.—Catalyst study

| | Parts |
|---|---|
| Succinic anhydride | grams 25 |
| Propylene oxide | do 17.4 |
| Sodium hydroxide solution (50% aqueous) | Per Table II |

Three reactions were run with succinic anhydride and propylene oxide in the proportions set forth hereinabove, with the sodium hydroxide catalyst being varied as set forth in Table II. In each case the ingredients were charged into a beverage bottle which was then capped and agitated in a water bath at 70° C. for 16 hours. All of the products were viscous polyesters, the acid numbers of which are set forth herewith in Table II.

TABLE II

| | Run No. 1 | Run No. 2 | Run No. 3 |
|---|---|---|---|
| Parts of Sodium Hydroxide Solution Used drops | 10 | 15 | 20 |
| Acid Number | 80 | 76 | 106 |

Example IV

| | Parts |
|---|---|
| Succinic anhydride | 50 |
| Propylene oxide | 40.6 |
| Sodium hydroxide solution (50% aqueous) | 1 |

The above ingredients were charged into a pressure vessel, which was then sealed, and the ingredients were heated to 70° C. and agitated for 64 hours. The reaction mass was then cooled to 25° C. and removed from the pressure vessel. The product was a viscous polyester containing some solid material. The product had an acid number of 15.

Example V.—Mixed polyethylene-propylene glycol succinate

| | Parts |
|---|---|
| Succinic anhydride | 50 |
| Propylene oxide | 17.4 |
| Ethylene oxide | 13.2 |
| Sodium hydroxide solution (50% aqueous) | 1 |

The above ingredients were reacted together as described in Example IV. The product was a viscous oil containing some solid matter and having an acid number of 20.

Example VI.—Catalyst study—Mixed alkylene oxides

| | Parts |
|---|---|
| Succinic anhydride | 50 |
| Ethylene oxide | 15.4 |
| Propylene oxide | 19.3 |
| Sodium hydroxide solution (50% aqueous) | Per Table III |

Two runs were conducted using the succinic anhydride, ethylene oxide and propylene oxide in the proportions set forth in the schedule above and varying the sodium hydroxide catalyst as set forth hereinbelow in Table III. In each case the reactants were charged into a pressure vessel, which was then sealed, and the contents agitated at 70° C. for 65 hours. The reaction mixture was thereafter cooled to 25° C. and discharged from the vessel. There appeared to be a small amount of unreacted ethylene and propylene oxides which were vented from the vessel prior to the discharge. The products were viscous polyesters having small amounts of solids suspended therein. The amounts of catalyst used, and the acid numbers of the products, are set forth herewith:

TABLE III

| | Run No. 1 | Run No. 2 |
|---|---|---|
| Parts of Sodium Hydroxide Solution Used | 1 | 0.5 |
| Acid Number of Product | 8 | 48 |

Example VII.—Sodium phthalate catalyst study

| | Parts |
|---|---|
| Succinic anhydride | 25 |
| Propylene oxide | 14.5 |
| Ethylene oxide | 11 |
| Glycerol | 2.5 |
| Disodium phthalate (catalyst) | Per Table IV |

A series of runs was made using the ingredients in the proportions set forth in the schedule above, and varying the sodium phthalate catalyst as set forth hereinbelow in Table IV. In each case the reactants and selected amount of catalyst were charged into a pressure vessel, which was then sealed, and the reactants heated at 70° C. for a duration of time set forth in Table IV. At the end of the reaction time selected, the charge was cooled to 25° C., the excess propylene and ethylene oxides vented, and the product discharged. Set forth herewith are the amounts of catalyst, duration of times involved in the reactions, together with the properties of the products.

TABLE IV

|  | Run No. 1 | Run No. 2 | Run No. 3 | Run No. 4 |
| --- | --- | --- | --- | --- |
| Parts of Sodium Phthalate Used | 1.0 | 0.5 | 0.1 | 0.1 |
| Duration of Reaction (Hours) | 27 | 27 | 27 | 41 |
| Color of Product | Amber | Amber | White |  |
| Acid Number | <1 | <1 | 47 | 21 |

*Example VIII*

| | Parts |
| --- | --- |
| Succinic anhydride | 100 |
| Ethylene oxide | 44 |
| Propylene oxide | 58 |
| Disodium phthalate | 0.1 |
| Glycerol | 10.0 |

The above reactants were heated together under pressure at 70° C. for 65 hours. At the end of this time the reactants were cooled to 25° C., the unreacted alkylene oxides vented and the product discharged. The resultant polyester was a water-white viscous liquid having an acid number of 27.

*Example IX*

| | Parts |
| --- | --- |
| Succinic anhydride | 100 |
| Ethylene oxide | 35.2 |
| Propylene oxide | 46.6 |
| Disodium phthalate | 0.6 |
| Glycerol | 10.0 |

The above ingredients were reacted together as in the preceding Example VIII. The product was an amber colored, viscous polyester having an acid number less than 1.

*Example X.—Succinic-maleic-propylene oxide reaction product*

| | Parts |
| --- | --- |
| Succinic anhydride | 15 |
| Maleic anhydride | 10 |
| Propylene oxide | 17.4 |
| Sodium hydroxide solution (50% aqueous) | 0.5 |

The above ingredients were reacted together at 70° C. for 30 hours. The product was a viscous liquid containing some solid material.

*Example XI.—Propylene oxide-succinic-phthalic anhydride reaction product*

| | Parts |
| --- | --- |
| Succinic anhydride | 50 |
| Phthalic anhydride | 74 |
| Propylene oxide | 58 |
| Sodium hydroxide solution (50% aqueous) | 0.9 |

The above reactants were reacted together under 70° C. for 16½ hours. The reactants were cooled to 25° C. and discharged. There resulted a viscous polyester product having a red coloration and an acid number of 98.

*Example XII.—Mixed polyethylene-propylene succinate-phthalate*

| | Parts |
| --- | --- |
| Succinic anhydride | 18.7 |
| Phthalic anhydride | 9.2 |
| Ethylene oxide | 11 |
| Propylene oxide | 14.5 |
| Glycerol | 2.5 |
| Disodium phthalate | Per Table V |

A series of runs was made in accordance with the foregoing schedule, varying the amount of disodium phthalate catalyst and the time of reaction as set forth hereinbelow in Table V. In each case the reactants were charged into a pressure vessel, which was then sealed, and the reactants heated at 70° C. for the time selected for the run. At the end of the selected time the charge was cooled to 25° C., the excess alkylene oxides vented, and the ester products discharged. Set forth herewith are the amounts of phthalate catalysts used, the times of reactions and the properties of the products in the several runs.

TABLE V

|  | Run No. 1 | Run No. 2 | Run No. 3 | Run No. 4 |
| --- | --- | --- | --- | --- |
| Parts of Sodium Phthalate Used | 1.0 | 0.5 | 0.1 | 0.1 |
| Reaction Time (Hrs.) | 27 | 27 | 27 | 41 |
| Color of Product | Light Amber. | Light Amber. | Water White. |  |
| Acid Number of Product | <1 | <1 | 33 | 13 |

*Example XIII.—Dodecenyl- and octenyl-succinic anhydride-ethylene oxide reaction product*

| | Parts |
| --- | --- |
| Dodecenyl or octenyl succinic anhydride [1] | 133 or 105 respectively. |
| Ethylene oxide | 35.2. |
| Glycerol | 10. |
| Disodium phthalate | 0.6. |

[1] Products marketed under this designation by the Humphrey Wilkinson Co., and manufactured by the reaction of the indicated alkene with maleic anhydride.

Two runs were made in accordance with the foregoing recipe, using the dodecenyl succinic anhydride and octenyl succinic anhydride in the respective runs in the quantities indicated. In each case the reactants were agitated together under pressure at 70° C. for 18 hours, cooled to 25° C. and discharged. The acid numbers of the dodecenyl and octenyl products were respectively less than 1 and 39. The viscosity of the dodecenyl succinic anhydride product was 27 centipoises.

*Example XIV.—Adipic anhydride-propylene oxide reaction product*

(A) Preparation of adipic anhydride:

| | Parts |
| --- | --- |
| Adipic acid | 48.7 |
| Acetic anhydride | 100 |

The above ingredients were refluxed together at atmospheric pressure for 7½ hours. The reaction mass was then subjected to distillation at 100° C. under a reduced pressure to remove the acetic acid and acetic anhydride. The residue was used as the adipic anhydride in the further reaction described below.

(B) Condensation of adipic anhydride with propylene oxide:

| | Parts |
| --- | --- |
| Adipic anhydride (prepared as just described) | 40 |
| Propylene oxide | 23.2 |
| Sodium methacrylate | 1.0 |

The above ingredients were charged into a beverage bottle which was then sealed and tumbled in a hot water bath at 90° C. for 18 hours. The propylene oxide was completely reacted as evidenced by the absence of any pressure in the bottle. The resultant polyester had an acid number of 47 and a Gardner viscosity of T–U.

From the foregoing general discussion and detailed specific examples, it will be seen that this invention provides a novel method for the preparation of polyalkylene glycol polyesters of alkylene dicarboxylic acids. The process is expeditiously carried out in simple equipment with a minimum of skilled attendance. The reactants, namely the alkylene dicarboxylic acid anhydrides and the alkylene oxides, are cheaply and abundantly available.

What is claimed is:

1. Process which comprises reacting together, at temperatures in the range 30°–150° C., (A) a substance selected from the class consisting of anhydrides of alkylene dicarboxylic acids containing from 4 to 16 carbon atoms and mixtures thereof with anhydrides of other dicarboxylic acids, said mixtures containing at least 80% by weight of said anhydrides of said alkylene dicarboxylic acids with (B) an alkylene oxide containing from 2 to 4 carbon atoms, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

2. Process which comprises reacting together, at temperatures in the range 30°–150° C., (A) a substance selected from the class consisting of anhydrides of alkylene dicarboxylic acids containing from 4 to 16 carbon atoms and mixtures thereof with anhydrides of other dicarboxylic acids, said mixtures containing at least 80% by weight of said anhydrides of said alkylene dicarboxylic acids with (B) ethylene oxide, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

3. Process which comprises reacting together, at temperatures in the range 30°–150° C., (A) a substance selected from the class consisting of anhydrides of alkylene dicarboxylic acids containing from 4 to 16 carbon atoms and mixtures thereof with anhydrides of other dicarboxylic acids, said mixtures containing at least 80% by weight of said anhydrides of said alkylene dicarboxylic acids with (B) propylene oxide, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

4. Process which comprises reacting together, at temperatures in the range 30°–150° C., (A) a substance selected from the class consisting of anhydrides of alkylene dicarboxylic acids containing from 4 to 16 carbon atoms and mixtures thereof with anhydrides of other dicarboxylic acids, said mixtures containing at least 80% by weight of said anhydrides of said alkylene dicarboxylic acids with (B) a mixture of ethylene and propylene oxides, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

5. Process which comprises reacting together, at temperatures in the range 30°–150° C., (A) succinic anhydride with (B) ethylene oxide, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

6. Process which comprises reacting together, at temperatures in the range 30°–150° C., (A) succinic anhydride with (B) propylene oxide, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

7. Process which comprises reacting together, at temperatures in the range 30°–150° C., (A) succinic anhydride with (B) a mixture of ethylene and propylene oxides, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

8. Process which comprises reacting together, at temperatures in the range 30°–150° C., (A) succinic anhydride with (B) an alkylene oxide containing from 2 to 4 carbon atoms, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

9. Process which comprises reacting together, at temperatures in the range 30°–150° C., (A) dodecenyl succinic anhydride with (B) an alkylene oxide containing from 2 to 4 carbon atoms, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

10. Process which comprises reacting together, at temperatures in the range 30°–150° C., (A) adipic anhydride with (B) an alkylene oxide containing from 2 to 4 carbon atoms, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

11. Process which comprises reacting together, at temperatures in the range 30°–150° C., (A) dodecenyl succinic anhydride with (B) ethylene oxide, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

12. Process which comprises reacting together, at temperatures in the range 30°–150° C., (A) adipic anhydride with (B) propylene oxide, in the presence of (C) from 0.5 to 5.0%, based on the weight of the reaction mixture, of a catalyst selected from the group consisting of alkali metal, alkaline earth metal and organic ammonium salts and hydroxides together with at least 10% of water based on the weight of said selected catalyst.

References Cited in the file of this patent

FOREIGN PATENTS 500,300     Great Britain _____ Feb. 7, 1939